(12) United States Patent
Nankai et al.

(10) Patent No.: US 7,983,483 B2
(45) Date of Patent: Jul. 19, 2011

(54) AUTOMATIC CHARACTER RECOGNITION SYSTEM AND COMPUTER PRODUCT

(75) Inventors: Hiroko Nankai, Ishikawa (JP); Kiyoto Kosaka, Ishikawa (JP); Takayuki Kawanaka, Ishikawa (JP)

(73) Assignee: PFU Limited, Ishikawa (JP)

( * ) Notice: Subject to any disclaimer, the term of this patent is extended or adjusted under 35 U.S.C. 154(b) by 1153 days.

(21) Appl. No.: 11/425,984

(22) Filed: Jun. 22, 2006

(65) Prior Publication Data

US 2007/0104367 A1    May 10, 2007

(30) Foreign Application Priority Data

Nov. 10, 2005  (JP) .................................. 2005-326633

(51) Int. Cl.
*G06K 9/34* (2006.01)
(52) U.S. Cl. ........................................ 382/176; 382/181
(58) Field of Classification Search .................. None
See application file for complete search history.

(56) References Cited

FOREIGN PATENT DOCUMENTS

| EP | 0 217 655 A2 | 4/1987 |
|---|---|---|
| JP | 52-102638 | 8/1977 |
| JP | 62074170 | 4/1987 |
| JP | 05-081466 | 4/1993 |
| JP | 05189336 | 7/1993 |
| JP | 06052346 | 2/1994 |
| JP | 06096261 | 4/1994 |
| JP | 10269323 | 10/1998 |
| JP | 2002324155 | 11/2002 |
| JP | 2005258577 | 9/2005 |

OTHER PUBLICATIONS

Office Action dated Oct. 22, 2008.
Japanese Office Action for Application No. 2005-326633 mailed Mar. 8, 2011.

*Primary Examiner* — Vikkram Bali
*Assistant Examiner* — Elisa M Rice
(74) *Attorney, Agent, or Firm* — Lowe, Hauptman, Ham & Berner, LLP (57) ABSTRACT

An image-data-acquisition control unit controls an image-data acquiring unit that acquires computer-recognizable image data, to accumulate the image data in a set of information units. A character-recognition control unit controls an optical character-recognizing unit that extracts a character from the set of image data accumulated by the image-data-acquisition control unit, to accumulate a group of characters obtained by the optical character-recognizing unit in a set of character information units. Once a start signal is received from a starting unit, the image-data-acquisition control unit and the character-recognition control unit continue to operate independently.

8 Claims, 7 Drawing Sheets

AUTOMATIC CHARACTER RECOGNITION SYSTEM AND COMPUTER PRODUCT

RELATED APPLICATIONS

The present application is based on, and claims priority from, Japanese Application Number 2005-326633, filed Nov. 10, 2005, the disclosure of which is hereby incorporated by reference herein in its entirety.

BACKGROUND OF THE INVENTION

1. Field of the Invention

The present invention relates to a technology for automatically extracting a character from an image of a document with a high time-efficiency.

2. Description of the Related Art

Figure 9:
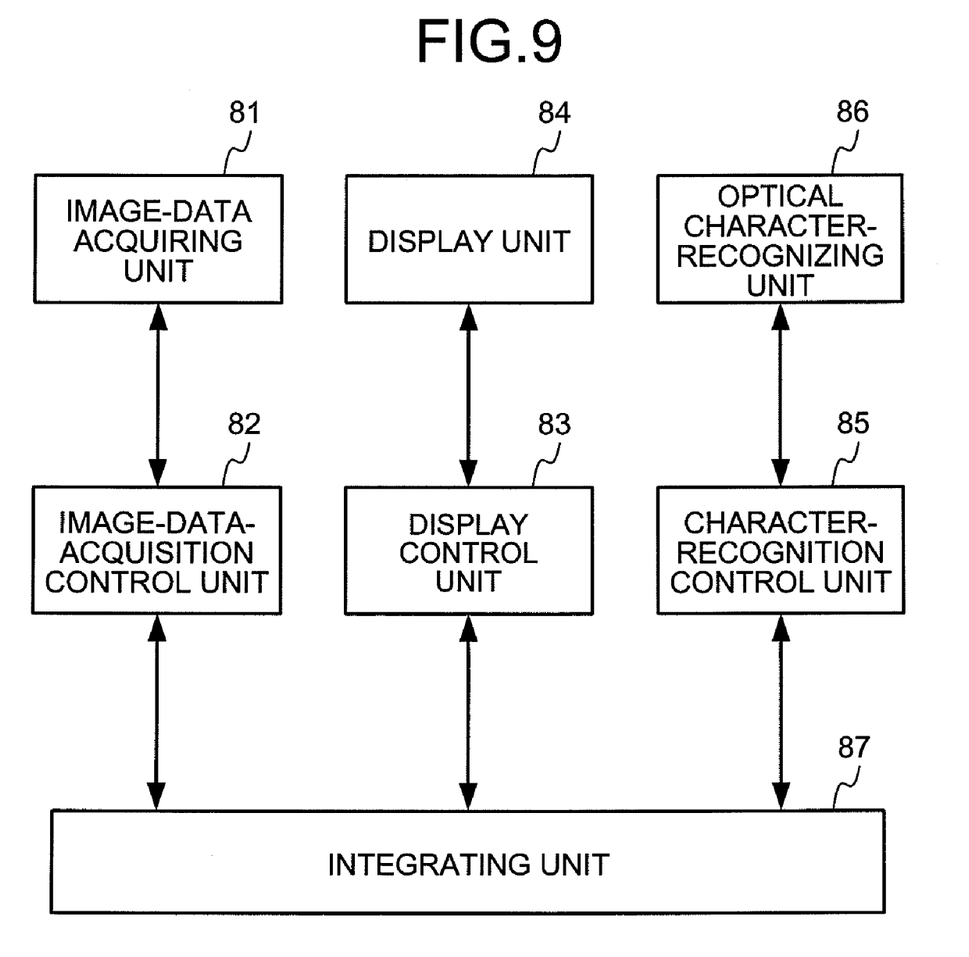
FIG. 9 is a block diagram of a conventional automatic character recognition system.

FIG. 9 is a block diagram of a conventional automatic character recognition system. Conventionally, to extract a text character (including a line, hereinafter simply "a character") included in image data acquired by an image-data acquiring unit 81 such as a scanner, a digital camera, and a facsimile, a series of operations, namely image data acquisition, image display, and optical character recognition (OCR), are performed. These operations are performed by the image-data acquiring unit 81, a display unit 84, and an optical character-recognizing unit 86.

The image-data acquiring unit 81 is controlled by an image-data-acquisition control unit 82 configured by software operated on a computer. The display unit 84 such as a monitor for recognition and the like of acquired image data is similarly controlled by a display control unit 83 configured by software. The optical character-recognizing unit 86 itself, and a character-recognition control unit 85 that controls the optical character-recognizing unit 86, are also configured by software. Unlike an earlier technology (for example, Japanese Patent Application Laid-open No. S52-102638) in which the character recognition takes a considerably long time, a character recognition technology configured by software are becoming familiar, with the help of increased speed of recent calculating unites (for example, Japanese Patent Application Laid-open No. H5-81466).

However, in the conventional automatic character recognition system described above, the control units 82, 83, and 85 are sequence-controlled by a higher control unit, namely an integrating unit 87. After the automatic character recognition step starts, the integrating unit 87 acquires image data by causing the image-data-acquisition control unit 82 to operate, and uses the display control unit 83 to make the display unit display the acquired image data. After the display is completed, the integrating unit 87 controls the optical character-recognizing unit 86 using the character-recognition control unit 85 and finally extracts the character.

In this configuration, since the image-data-acquisition control unit 82, the display control unit 83, the character-recognition control unit 85, and the integrating unit 87 constitute a single application, if the integrating unit 87 stops, the other control units also stop, and if the integrating unit 87 starts operating, according to the sequence-control executed by the integrating unit 87, "one of" the control units becomes functional. Consequently, no matter how small the load on the computer, priority cannot be given to the operation of the optical character-recognizing unit 86 that places the largest load on the calculating unit, which is inefficient.

Even when the automatic character recognition operation becomes disrupted due to an increase in the load on the calculating unit, while other software is operating on the computer, it depends on the integrating unit 87 which operation is disrupted. Generally, the optical character-recognizing unit 86 is likely to become disrupted since it executes complex operations and places the largest load on the calculating unit. Even if the operation is an image data acquisition operation which places a comparatively light load on the calculating unit and there is no disruption, since the optical character-recognizing unit 86 is likely to become disrupted, the efficiency of the automatic character recognition operation is considerably poor. This becomes even more problematic when an image-data acquiring unit such as a scanner is capable of acquiring image data at higher speed. Operations in the optical character-recognizing unit 86 should preferably be postponed, and precedence given to the functions of the image-data acquiring unit.

SUMMARY OF THE INVENTION

It is an object of the present invention to at least partially solve the problems in the conventional technology.

An automatic character recognition system according to one aspect of the present invention includes an image-data acquiring unit that acquires computer-recognizable image data; an image-data-acquisition control unit that controls the image-data acquiring unit to accumulate the image data in a set of information units; an optical character-recognizing unit that extracts a character from the set of image data accumulated by the image-data-acquisition control unit; a character-recognition control unit that controls the optical character-recognizing unit to accumulate a group of characters obtained by the optical character-recognizing unit in a set of character information units; and a starting unit that outputs a start signal for triggering a character recognition process. Once the start signal is received from the starting unit, the image-data-acquisition control unit and the character-recognition control unit continue to operate independently.

An automatic character recognition system according to another aspect of the present invention includes an image-data acquiring unit that acquires computer-recognizable image data; an image-data-acquisition control unit that controls the image-data acquiring unit to accumulate the image data in a set of information units; a display control unit that displays the image data accumulated by the image-data-acquisition control unit as an original image on a display unit; an optical character-recognizing unit that extracts a character from the set of image data accumulated by the image-data-acquisition control unit; a character-recognition control unit that controls the optical character-recognizing unit to accumulate a group of characters obtained by the optical character-recognizing unit in a set of character information units; and a starting unit that outputs a start signal for triggering a character recognition process. Once the start signal is received from the starting unit, the image-data-acquisition control unit and the character-recognition control unit continue to operate independently, and the display control unit independently displays the set of image data upon the image-data-acquisition control unit accumulating the set of image data.

A computer-readable recording medium according to still another aspect of the present invention stores therein a computer program for an automatic character recognition system. The automatic character recognition system includes an image-data acquiring unit that acquires computer-recognizable image data; an optical character-recognizing unit that extracts a character from the set of image data accumulated by the image-data-acquisition control unit; and a starting unit that outputs a start signal for triggering a character recognition process. The computer program causes a computer to execute controlling the image-data acquiring unit to accumulate the image data in a set of information units; and controlling the optical character-recognizing unit to accumulate a group of characters obtained by the optical character-recognizing unit in a set of character information units. Once the start signal is received from the starting unit, the controlling the image-data acquiring unit and the controlling the optical character-recognizing unit are repeated independently.

A computer-readable recording medium according to still another aspect of the present invention stores therein a computer program for an automatic character recognition system. The automatic character recognition system includes an image-data acquiring unit that acquires computer-recognizable image data; an optical character-recognizing unit that extracts a character from the set of image data accumulated by the image-data-acquisition control unit; and a starting unit that outputs a start signal for triggering a character recognition process. The computer program causes a computer to execute displaying the image data accumulated by the image-data-acquisition control unit as an original image on a display unit; controlling the image-data acquiring unit to accumulate the image data in a set of information units; and controlling the optical character-recognizing unit to accumulate a group of characters obtained by the optical character-recognizing unit in a set of character information units. Once the start signal is received from the starting unit, the image-data-acquisition control unit and the character-recognition control unit continue to operate independently, and the displaying includes displaying independently the set of image data upon the image-data-acquisition control unit accumulating the set of image data.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. Note that the invention is not limited to the embodiments. Furthermore, constituent elements in the embodiments below include other elements that persons skilled in the art can easily assume or elements that are substantially the same.

Figure 1:
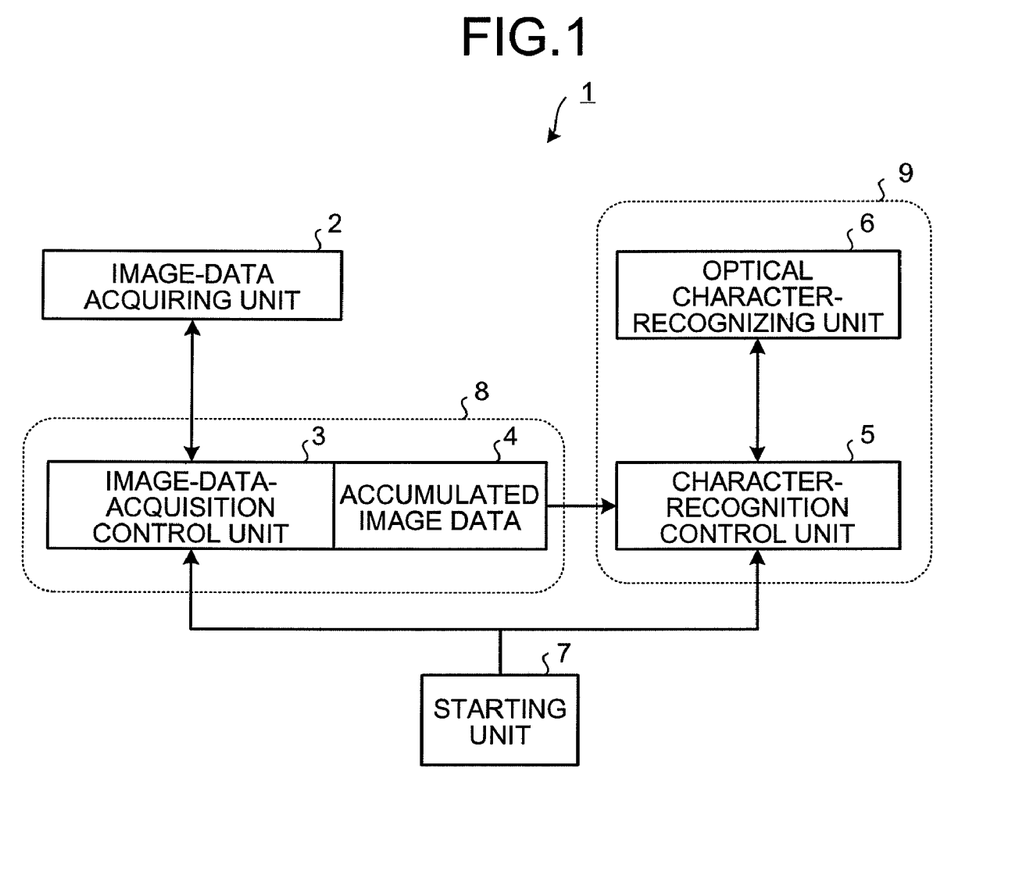
FIG. 1 is a block diagram of an automatic character recognition system according to a first embodiment of the present invention.

FIG. 1 is a block diagram of an automatic character recognition system 1 according to a first embodiment the present invention. The automatic character recognition system 1 includes an image-data acquiring unit 2 that acquires computer-recognizable image data, an image-data-acquisition control unit 3 that controls the image-data acquiring unit 2 and accumulates image data 4 into information units, an optical character-recognizing unit 6 that extracts characters included in the image data accumulated in the image-data acquiring unit 2 using an optical pattern recognition method, and a character-recognition control unit 5 that controls a character group obtained by the optical character-recognizing unit 6 while accumulating them into sets of character information units.

The image-data acquiring unit 2 includes a digital camera, a facsimile, a scanner, or the like. The image-data-acquisition control unit 3 controls the image-data acquiring unit 2 while sending acquisition execution commands and information required for acquisition and receiving acquisition completion signals from the image-data acquiring unit 2. A set of image data is accumulated while dividing it into units known as files in a general operation system (OS). For example, image data is accumulated into a portable document format (PDF) file including several pages of images and a PDF file including only one page of images.

The optical character-recognizing unit 6 performs OCRs based on the image data. The character-recognition control unit 5 accumulates the character groups obtained by the OCRs while dividing them into units known as files. When the image-data-acquisition control unit 3 and the character-recognition control unit 5 once receive a start signal from a starting unit 7, they repeatedly control their respective control targets independently without mutual interference. That is, the image-data-acquisition control unit 3 repeatedly controls the image-data acquiring unit 2, and the character-recognition control unit 5 repeatedly controls the optical character-recognizing unit 6.

As described above, since the image-data-acquisition control unit 3 closely relates to a folder in which image data is accumulated in file units, a region 8 enclosed by a dotted-line in FIG. 1 can be regarded as independent. The character-recognition control unit 5 controls the optical character-recognizing unit 6. A region 9 enclosed by a dotted-line in FIG. 1 can also be regarded as independent.

A keyboard and a graphical user interface (GUI) of an application that makes the automatic character recognition system effective can be used as the starting unit 7. With this configuration, when the computer load is lightened, the image-data-acquisition control unit 3 and the character-recognition control unit 5 can execute their processes as much as possible, enabling a spare time of the computer to be used without wasting it. This spare time arises when a user is not operating the computer and when the load of the calculating unit is light.

Figure 2:
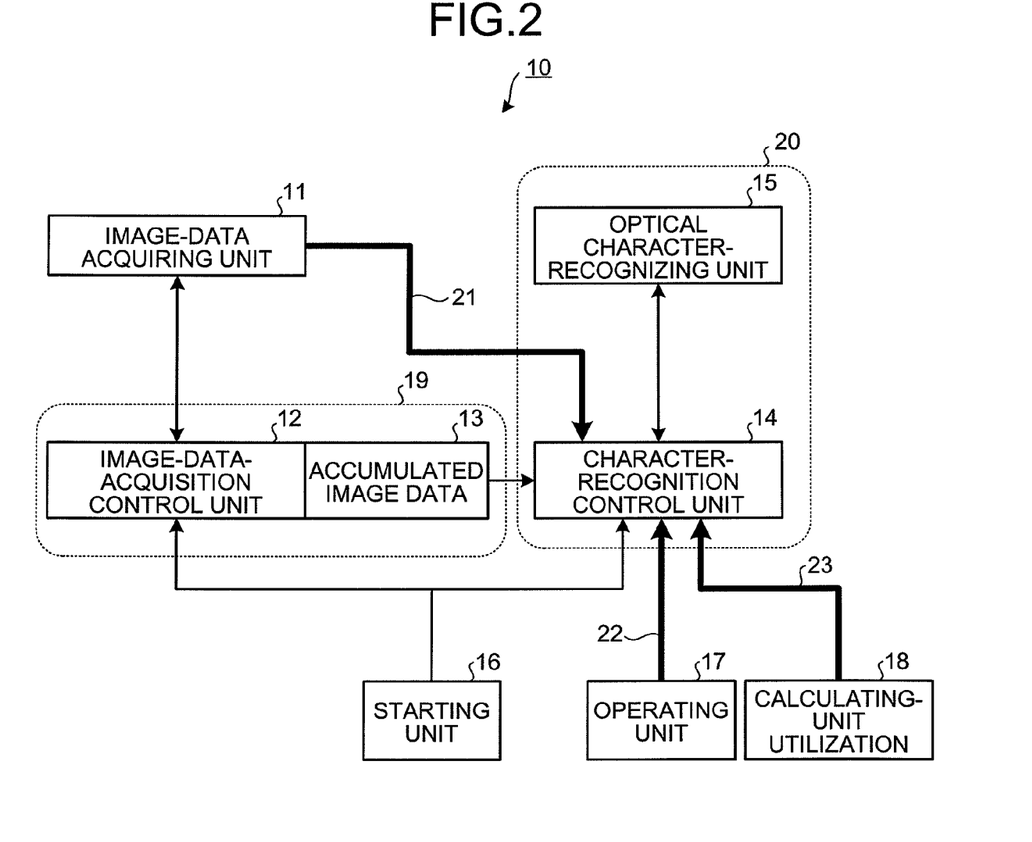
FIG. 2 is a block diagram of an automatic character recognition system according to a second embodiment of the present invention.

FIG. 2 is a block diagram of an automatic character recognition system 10 according to a second embodiment of the present invention. The basic configuration of the automatic character recognition system 10 is the same as the first embodiment, as is the feature that, when a start signal is once received from a starting unit 16, an image-data-acquisition control unit 12 and a character-recognition control unit 14 repeatedly control an image-data acquiring unit 11 and an optical character-recognizing unit 15, independently and without mutual interference.

Since the image-data-acquisition control unit 12 closely relates to accumulated image data 13 that is accumulated in file units, a region 19 enclosed by a dotted-line in FIG. 2 can be regarded as independent. The character-recognition control unit 14 controls the optical character-recognizing unit 15, and a region 20 indicated by a dotted-line in FIG. 2 can be also regarded as independent.

A feature of the second embodiment is that, according to a signal 22 from an operation device in an operating unit 17 of the computer (for example, a keyboard, a mouse, a trackball, or a pen tablet), a signal 21 indicating that the image-data acquiring unit 11 is operating, and a signal 23 based on a calculating-unit utilization 18 that controls operations of the system, the character-recognition control unit 14 arbitrarily stops controlling the optical character-recognizing unit 15, and restarts controlling it when the control signal stops.

Operation devices such as a keyboard are generally used as the operating unit of the computer. When these devices are manipulated, the signal 22, or a wireless signal, is transmitted to the character-recognition control unit 14. When the character-recognition control unit 14 receives the signal 22 and stops controlling the optical character-recognizing unit 15, the load on the calculating unit is reduced by an amount equivalent to the large load that the optical character-recognizing unit 15 placed on the calculating unit, enabling priority to be given to the operations of the image-data acquiring unit 11 via the image-data-acquisition control unit 12 and promoting the operation of the accumulated image data 13.

The significance of this configuration is that, when a user manipulates the keyboard and the like (i.e., when the user executes some kind of operation with respect to the computer), priority is given to the image-data acquiring unit where the user is often at the computer, such as when shuffling documents that images are printed on and the like. Since OCRs executed by the optical character-recognizing unit 15 use the image data accumulated in the image-data-acquisition control unit 12 to accelerate operations by software only, there is no need for the user to be at the computer.

It is therefore efficient to perform OCRs during the time when the user stops operating the computer, in consideration of the load on the calculating unit of the computer. In the present invention, the user changes the operation statuses of the control units of the automatic character recognition system merely by manipulating the operation device, making this automatic character recognition system remarkably efficient.

A similar effect can be obtained by using the signal 21 indicating that the image-data acquiring unit 11 such as a scanner is operating. If the signal 21 is not sent from the image-data acquiring unit 11 to the character-recognition control unit 14, the character-recognition control unit 14 restarts the OCR of the optical character-recognizing unit 15. Consequently, the image-data acquiring unit 11 automatically allocates its entire operations before the optical character-recognizing unit 15 executes the OCR. The signal 21 indicating that the image-data acquiring unit 11 is operating is not limited to one of either the signal 21 or the signal 22 from the operation device of the operating unit 17 described above, it being advantageous to use both.

The calculating-unit utilization 18 of the computer can be generally obtained by specifying suitable parameters (arguments) from an application and calling for an application program interface (API) function of the OS. The value of the usage rate is predetermined as a fixed value (for example, 60%) and if the usage rate exceeds this value, it is considered that a load is being placed on the calculating unit. In that case, the optical character-recognizing unit 15 does not perform an OCR. As a result, the timing of the OCR is during the time where the user is not operating the computer. This is more efficient with regard to the load on the calculating unit of the computer.

As described above, the image-data acquiring unit 11 postpones the OCR by automatically allocating its entire operations. Since the calculating-unit utilization 18 is used, the signal 21 indicating that the image-data acquiring unit 11 is operating and the signal 22 from the operation device of the operating unit can be used together. The calculating-unit utilization 18 can be used as a reference that simply indicates whether a fixed value is exceeded, and also as a general reference that indicates a large load on the calculating unit of the computer, such as whether an average value over a fixed period exceeds a fixed value.

Figure 3:
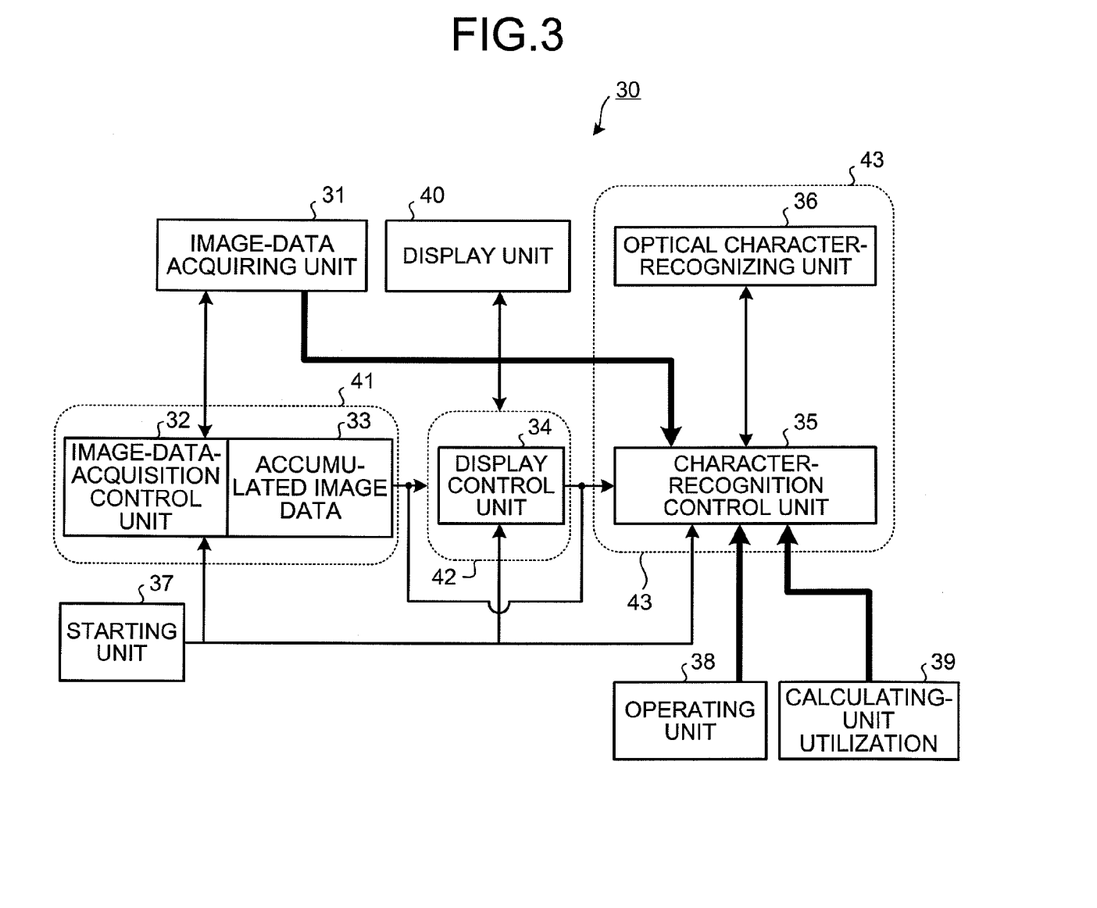
FIG. 3 is a block diagram of an automatic character recognition system according to a third embodiment of the present invention.

FIG. 3 is a block diagram of an automatic character recognition system 30 according to a third embodiment of the present invention. It is safe to say that the automatic character recognition system 30 has the same basic configuration as the second embodiment, and is also similar in that, when a start signal is once received from a starting unit 37, an image-data-acquisition control unit 32 and a character-recognition control unit 35 respectively repeatedly control an image-data acquiring unit 31 and an optical character-recognizing unit 36, independently and without mutual interference. According to a signal from an operation device in an operating unit 38 of the computer, a signal indicating that the image-data acquiring unit 31 is operating, and a signal based on a calculating-unit utilization 39 that controls the operations of the automatic character recognition system 30, the character-recognition control unit 35 arbitrarily stops controlling the optical character-recognizing unit 36, and restarts it when the control signal and the like stops.

According to the third embodiment, a display control unit 34 makes a display unit 40, such as a monitor, display image data 33 accumulated in the image-data-acquisition control unit 32 as original images. This indicates that the image-data acquiring unit 31 and the image-data-acquisition control unit 32 are operating normally. It also indicates how many images have been processed. The display control unit 34 displays the image data on the display unit 40 independently from the control units when the image-data-acquisition control unit 32 accumulates the image data as files.

This makes it possible to construct an efficient automatic character recognition system in which, when the load of the calculating unit of the computer is reduced, the control units 32, 34, and 35, including the display control unit 34, operate independently and use the freed load exhaustively. Since the display control unit 34 is independent, even if the user determines that an image display is useless and stops it, this does not affect the other control units, and the freed load of the calculating unit thereby obtained is used by the control units, making it possible to construct the automatic character recognition system even more efficiently.

Since the image-data-acquisition control unit 32 closely relates to the image data 33 accumulated in file units, a region 41 enclosed by a dotted-line in FIG. 3 can be regarded as independent. The character-recognition control unit 35 controls the optical character-recognizing unit 36. A region 43 enclosed by a dotted-line in FIG. 4 can also be regarded as independent. Similarly, the display control unit 34 enclosed by a dotted-line 42 is also independent.

Figure 4:
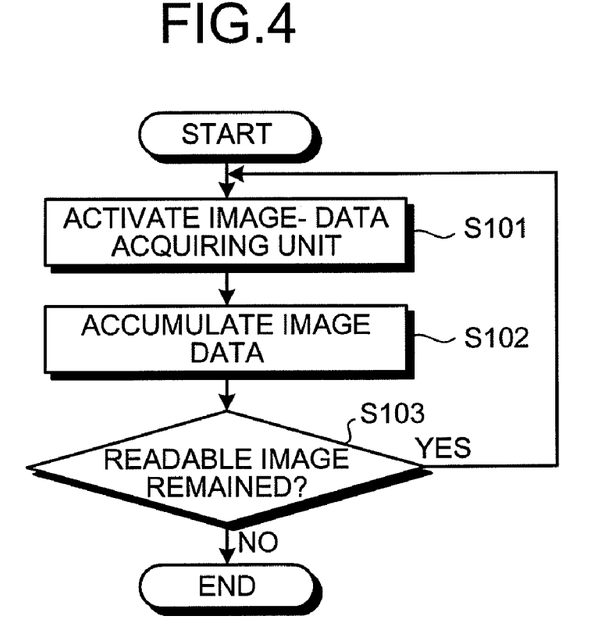
FIG. 4 is a flowchart of a main control procedure performed by an image-data-acquisition control unit.

FIG. 4 is a flowchart of a main control procedure performed by the image-data-acquisition control unit. The image-dataacquisition control unit activates an image-data acquiring unit being controlled, such as a scanner (step S101), and makes it extract the image data exactly according to the characters. The acquired image data is accumulated as a set of image data units (for example, a PDF file) (step S102), and this is repeated until no more readable images remain without being affected by other control units (step S103).

Figure 5:
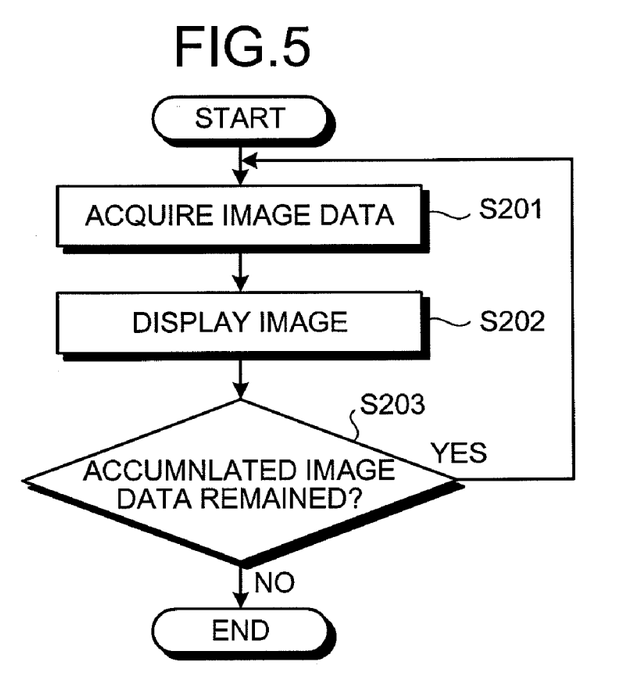
FIG. 5 is a flowchart of a main control procedure performed by a display control unit.

FIG. 5 is a flowchart of a main control procedure performed by the display control unit. The display control unit acquires image data accumulated in each file by the image-data-acquisition control unit (step S201). It then displays the image data as an original image (step S202), repeating this operation until there is no more accumulated image data (step S203). While the images are generally displayed in a so-called thumbnail display, the display should preferably be any type that enables the images acquired by the image-data acquiring unit to be identified at one glance.

Figure 6:
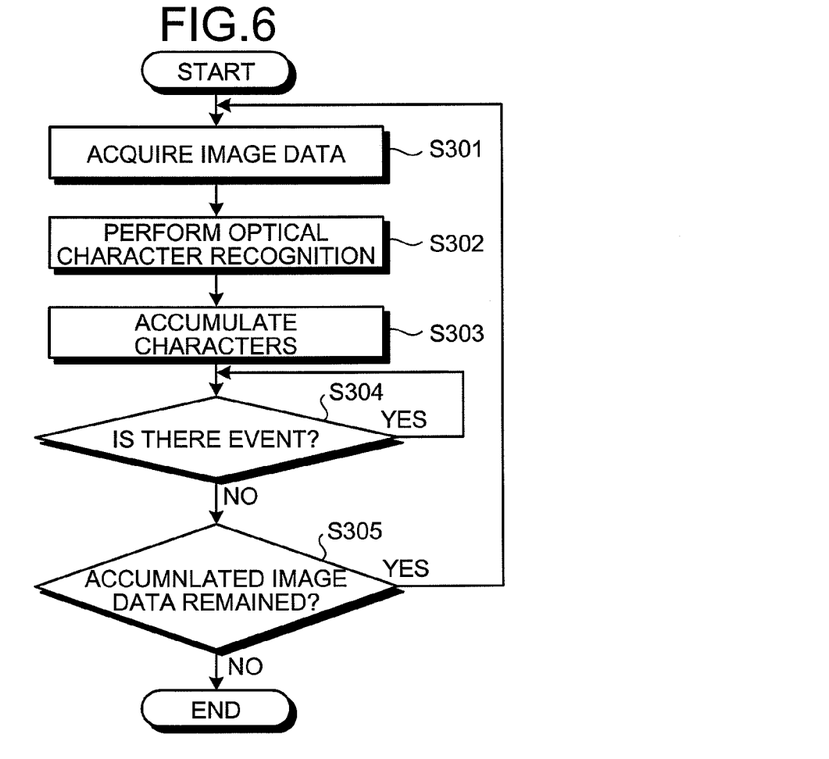
FIG. 6 is a flowchart of a main control procedure performed by a character-recognition control unit.

FIG. 6 is a flowchart of a main control procedure performed by the character-recognition control unit. In the same manner as the display control unit, the character-recognition control unit firstly acquires image data accumulated in each file by the image-data-acquisition control unit (step S301). Based on this image data, the character-recognition control unit uses optical pattern recognition method to perform an OCR (step S302). The characters (including characters and ruled lines) acquired by the OCR are accumulated in sets as for each file (step S303), and the character-recognition control unit then determines whether there is an event such as a signal indicating that the image-data acquiring unit has become operational, a signal indicating that an operation device has been used, and a signal that generates a rise in the usage rate of the calculating unit (step S304).

During an event, processing continues around the loop and the series of controls that includes image data acquisition (step S301), optical character recognition (step S302), and character accumulation (step S303) is stopped. When the event ends, optical character recognition is performed while any accumulated image data remains (step S305). While in this example the stopping of character recognition depending on whether there is an event is included in step 304, to stop character recognition whenever an event occurs, a procedure that can stop character recognition or the like due to an event is needed somewhere between steps S301 and S305. Furthermore, although the above explanation is simplified by using a loop flow to stop control, since looping the control in this way also places a load on the calculating unit, it is preferable to use a general control method and programming method (for example, OS interrupt processing) to avoid placing a load on the calculating unit as much as possible.

Figure 7:
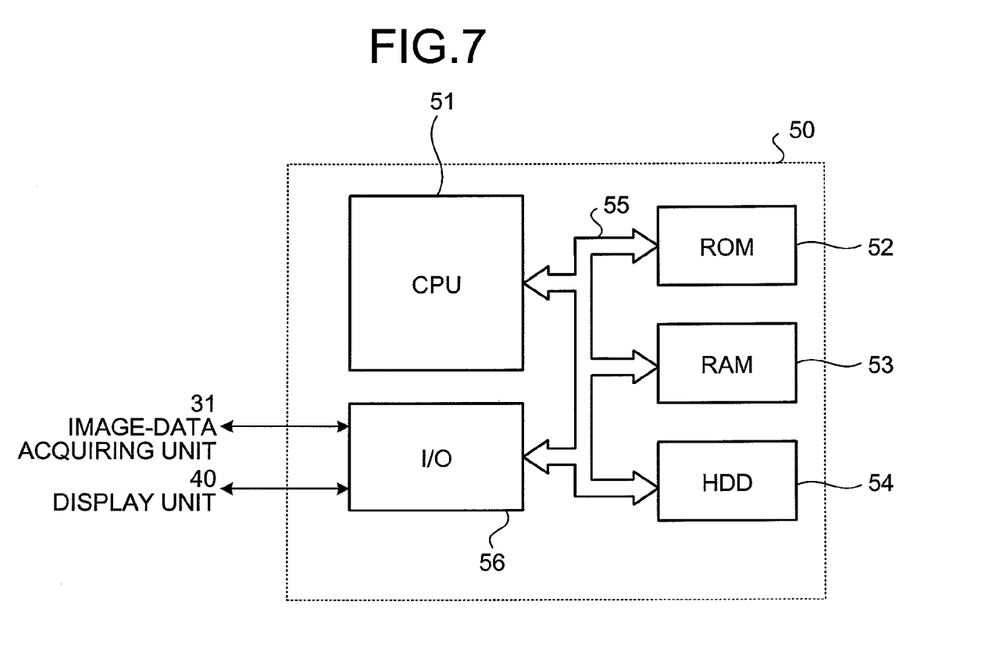
FIG. 7 is a block diagram of an example of a hardware configuration for implementing the present invention.

FIG. 7 is a block diagram of an example of a hardware configuration for implementing the present invention. The control units and optical character-recognizing unit of the present invention are configured by software and executed specifically using hardware to configure a control apparatus 50 including a read only memory (ROM) 52, a random access memory (RAM) 53, a recording medium 54 such as a hard disk, and an input/output (I/O) interface 56 that are centered around a central processing unit (CPU) 51 and connected via a bus 55. Programs to be executed by the CPU 51 are stored beforehand in the ROM 52. A program for communicating with the I/O interface 56 and an image processing program are also stored in the ROM 52. Electrical signals to the display unit 40 and the image-data acquiring unit 31, signals to operation devices such as a keyboard, are exchanged with the I/O interface 56.

Figure 8:
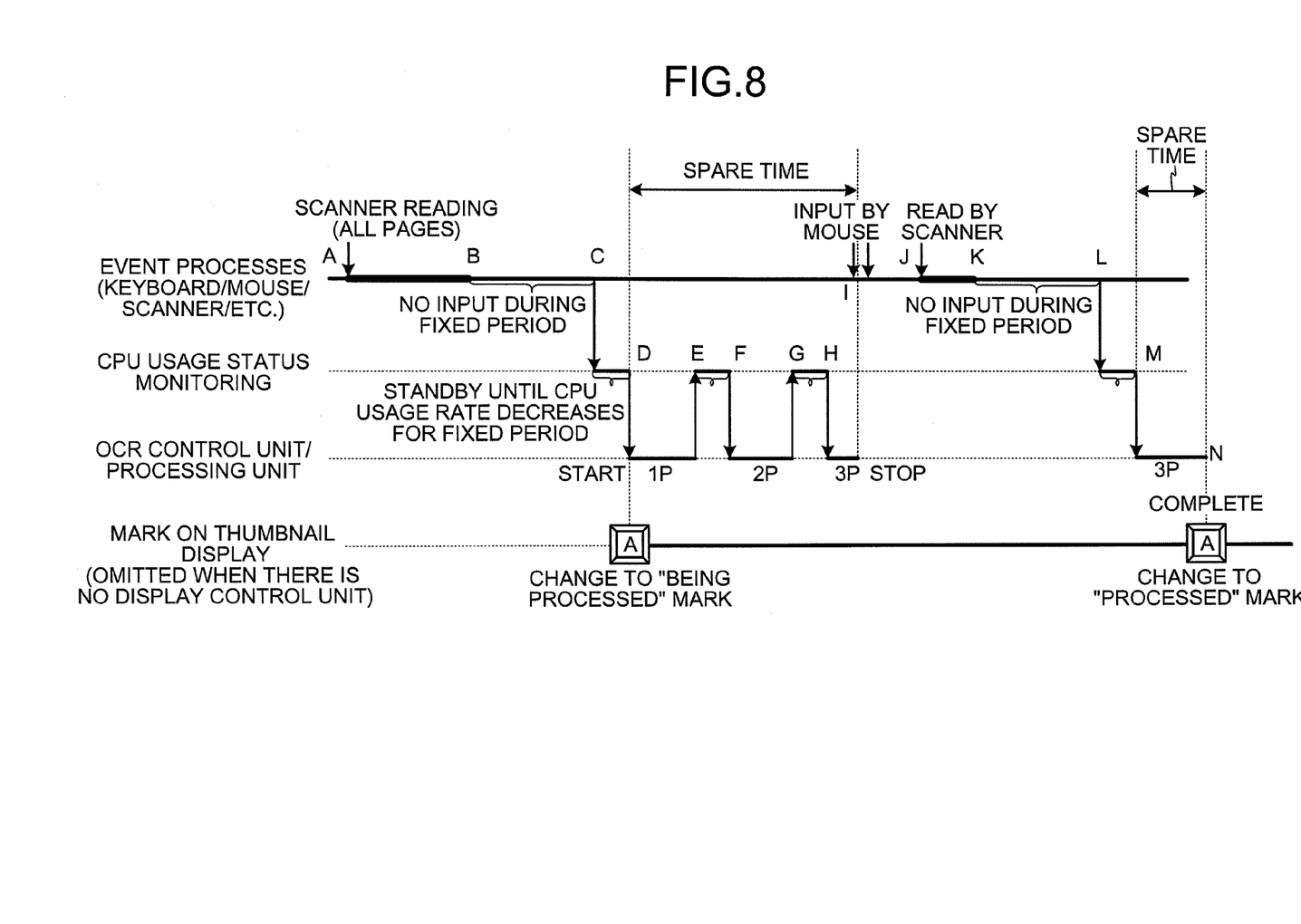
FIG. 8 is a timing chart for illustrating timings at which OCR processing according to the present invention is performed.

FIG. 8 is a timing chart for illustrating timings at which the OCR processing according to the present invention is performed. This timing chart indicates, from the top, timings of event processes of a keyboard, a mouse, a scanner and the like, the usage status of a calculating unit (CPU), operation timings of an optical character-recognition control unit (OCR control unit), and timings of displaying icons and marks on a display control unit. In this example, the scanner starts reading an image (acquiring image data) at point A. If the configuration is that of FIG. 3, a signal from an image-data acquiring unit is transmitted to an optical character-recognizing unit and no OCR is performed at the timing of the point A. This is shown in FIG. 8.

One set (all the pages of an image document in one setting) is read (until point B in FIG. 8), and then no OCR is performed until point C so that the read images can be displayed. Furthermore, no OCR is performed until point D, since the usage rate of the CPU is high and exceeds a fixed value. OCRs start to be performed after the point D, where the usage rate of the CPU decreases. When the first page is finished, the usage rate of the CPU increases from point E to point F due to OCR processing of the first page, and therefore OCR processing is stopped during this period. The usage rate of the CPU decreases from the point F and an OCR of the second page starts until point G where, as before, the usage rate of the CPU increases due to OCR processing of the second page, and OCR processing is stopped from the point G to point H.

At point I, an event signal from a mouse is transmitted to the character-recognition control unit, and OCR processing once again continues 'around the loop'. Since an image document is again set in the scanner at point J, the scanner again continues reading the images until point K. One set (all the pages of an image document in one setting) is read, and no OCR is performed until point L so that the read images can be displayed. No OCR is performed until point M, since the usage rate of the CPU is high and exceeds a fixed value. Recognition and extraction of characters included in a third page starts again at the point M, where no event signal is generated and the usage rate of the CPU is decreasing, and end at point N.

A mark indicating that an OCR is being processed is displayed at the point D in FIG. 8 on a display unit such as a thumbnail display, and the mark is changed at the point N to one indicating that an OCR for the third page is completed, making it easy for the user to understand which type of processing has been executed. As shown in this timing chart, even if the user is not aware of it, after operating the automatic character recognition system, a spare time of the calculating unit of the computer (periods when the user is not manipulating the computer and when the CPU usage rate is low) is used in performing OCRs, ensuring that character recognition and extraction are remarkably efficient. If the scanner is capable of high-speed reading, the sections in FIG. 8 between the points A and B, and between J and K, are shortened by a certain extent, obtaining an advantage that these periods of the spare time can be used effectively.

As described above, according to an embodiment of the present invention, character recognition can be performed automatically in consideration of the processing load on the computer by using the spare time efficiently and without wasting it. A computer program according to the present invention makes it possible to construct an automatic character recognition system in which an image-data-acquisition control unit and a character-recognition control unit configured by software can use a hardware resource (i.e., a computer) to perform character recognition automatically while considering the processing load on the computer by using the spare time efficiently and without wasting it, in the same manner as above.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An automatic character recognition system comprising:
    an image-data acquiring unit for acquiring computer-recognizable image data;
    an image-data-acquisition control unit for controlling the image-data acquiring unit in order to accumulate the image data in a set of information units;
    an optical character-recognizing unit for extracting a character from the set of image data accumulated by the image-data-acquisition control unit;
    a character-recognition control unit that controls the optical character-recognizing unit for accumulating a group of characters obtained by the optical character-recognizing unit in a set of character information units; and
    a starting unit that outputs a start signal for triggering a character recognition process, wherein
    once the start signal is received from the starting unit, the image-data-acquisition control unit and the character-recognition control unit repeatedly control the image-data acquiring unit and the optical character-recognizing unit, respectively and independently without mutual interference;
    wherein the character-recognition control unit arbitrarily stops controlling the optical character-recognizing unit when a CPU usage rate of a calculating unit that governs operations of the automatic character recognition system exceeds a predetermined value.

2. The automatic character recognition system according to claim 1, wherein
    the character-recognition control unit arbitrarily stops controlling the optical character-recognizing unit by a signal from an operating unit of a computer, and resumes controlling the optical character-recognizing unit when the signal stops.

3. The automatic character recognition system according to claim 1, wherein
    the character-recognition control unit arbitrarily stops controlling the optical character-recognizing unit by a signal indicating that the image-data acquiring unit is operating, and resumes controlling the optical character-recognizing unit when the signal stops.

4. An automatic character recognition system comprising:
    an image-data acquiring unit for acquiring computer-recognizable image data;
    an image-data-acquisition control unit that controls the image-data acquiring unit to accumulate the image data in a set of information units;
    a display control unit for displaying the image data accumulated by the image-data-acquisition control unit as an original image on a display unit;
    an optical character-recognizing unit for extracting a character from the set of image data accumulated by the image-data-acquisition control unit;
    a character-recognition control unit that controls the optical character-recognizing unit to accumulate a group of characters obtained by the optical character-recognizing unit in a set of character information units; and
    a starting unit for outputting a start signal for triggering a character recognition process, wherein
    once the start signal is received from the starting unit, the image-data-acquisition control unit and the character-recognition control unit repeatedly control the image-data acquiring unit and the optical character-recognizing unit, respectively and independently without mutual interference, and the display control unit independently displays the set of image data upon the image-data-acquisition control unit accumulating the set of image data;
    wherein the character-recognition control unit arbitrarily stops controlling the optical character-recognizing unit when a CPU usage rate of a calculating unit that governs operations of the automatic character recognition system exceeds a predetermined value.

5. The automatic character recognition system according to claim 4, wherein
    the character-recognition control unit arbitrarily stops controlling the optical character-recognizing unit by a signal from an operating unit of a computer, and resumes controlling the optical character-recognizing unit when the signal stops.

6. The automatic character recognition system according to claim 4, wherein
    the character-recognition control unit arbitrarily stops controlling the optical character-recognizing unit by a signal indicating that the image-data acquiring unit is operating, and resumes controlling the optical character-recognizing unit when the signal stops.

7. A non-transitory computer-readable recording medium that stores therein a computer program for an automatic character recognition system, wherein
    the automatic character recognition system includes
        an image-data acquiring unit that acquires computer-recognizable image data;
        an optical character-recognizing unit that extracts a character from the set of image data accumulated by the image-data-acquisition control unit; and
        a starting unit that outputs a start signal for triggering a character recognition process,
    the computer program causes a computer to execute
        controlling the image-data acquiring unit to accumulate the image data in a set of information units; and
        controlling the optical character-recognizing unit to accumulate a group of characters obtained by the optical character-recognizing unit in a set of character information units, and
    once the start signal is received from the starting unit, the controlling of the image-data acquiring unit and the controlling of the optical character-recognizing unit are repeated independently without mutual interference;
    wherein the character-recognition control unit arbitrarily stops controlling the optical character-recognizing unit when a CPU usage rate of a calculating unit that governs operations of the automatic character recognition system exceeds a predetermined value.

8. A non-transitory computer-readable recording medium that stores therein a computer program for an automatic character recognition system, wherein
    the automatic character recognition system includes
        an image-data acquiring unit that acquires computer-recognizable image data;
        an optical character-recognizing unit that extracts a character from the set of image data accumulated by the image-data-acquisition control unit; and
        a starting unit that outputs a start signal for triggering a character recognition process,
    the computer program causes a computer to execute displaying the image data accumulated by the image-data-acquisition control unit as an original image on a display unit;

controlling the image-data acquiring unit to accumulate the image data in a set of information units; and controlling the optical character-recognizing unit to accumulate a group of characters obtained by the optical character-recognizing unit in a set of character information units, and once the start signal is received from the starting unit, the image-data-acquisition control unit and the character-recognition control unit repeatedly control the image-data acquiring unit and the optical-character recognizing unit, respectively and independently without mutual interference, and the displaying includes displaying independently the set of image data upon the image-data-acquisition control unit accumulating the set of image data;

wherein the character-recognition control unit arbitrarily stops controlling the optical character-recognizing unit when a CPU usage rate of a calculating unit that governs operations of the automatic character recognition system exceeds a predetermined value.

\* \* \* \* \*